United States Patent
Saha et al.

(10) Patent No.: US 11,210,511 B2
(45) Date of Patent: *Dec. 28, 2021

(54) EVALUATING IMAGE-TEXT CONSISTENCY WITHOUT REFERENCE

(71) Applicant: International Business Machines Corporation, Armonk, NY (US)

(72) Inventors: Amrita Saha, Bangalore (IN); Srikanth G. Tamilselvam, Chennai (IN); Pankaj S. Dayama, Bangalore (IN); Priyanka Agrawal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/898,513

(22) Filed: Jun. 11, 2020

(65) Prior Publication Data

US 2020/0302167 A1    Sep. 24, 2020

Related U.S. Application Data

(63) Continuation of application No. 15/806,369, filed on Nov. 8, 2017, now Pat. No. 10,719,702.

(51) Int. Cl.
*G06K 9/00* (2006.01)
(52) U.S. Cl.
CPC ..... *G06K 9/00483* (2013.01); *G06K 9/00456* (2013.01)
(58) Field of Classification Search
CPC .............. G06K 9/00483; G06K 9/00456
See application file for complete search history.

(56) References Cited

U.S. PATENT DOCUMENTS

| 5,438,628 | A | 8/1995 | Spitz |
| 5,819,288 | A | 10/1998 | De Bonet |
| 6,565,610 | B1 | 5/2003 | Wang |
| 7,136,511 | B2 * | 11/2006 | Harrington ............ G06Q 10/10 382/112 |
| 7,783,117 | B2 | 8/2010 | Liu |

(Continued)

FOREIGN PATENT DOCUMENTS

CN    102184395 B    12/2012

OTHER PUBLICATIONS

"Convolutional Neural Networks (LeNet)", DeepLearning 0.1 document, <http://deeplearning.net/tutorial/lenet.html>, printed Jun. 28, 2017, 11 pages.

(Continued)

*Primary Examiner* — Shaghayegh Azima
(74) *Attorney, Agent, or Firm* — Joseph P. Curcuru

(57) ABSTRACT

Embodiments describing an approach to evaluate text and image consistency. Receiving one or more images. Receiving one or more text documents. Identifying relevant text in the one or more text documents. Determining the consistency between the one or more images and the one or more text documents. Creating one or more image and text consistency scores based on the determined consistency between the one or more images and the one or more text documents, and outputting the one or more image and text consistency scores for evaluating text and image consistency.

20 Claims, 4 Drawing Sheets

(56) References Cited

U.S. PATENT DOCUMENTS

| | | | |
|---|---|---|---|
| 8,718,375 B2* | 5/2014 | Ouyang | G06K 9/00416 |
| | | | 382/187 |
| 2008/0097941 A1* | 4/2008 | Agarwal | G06F 16/951 |
| | | | 706/12 |
| 2009/0319513 A1* | 12/2009 | Terao | G06F 16/48 |
| 2010/0075291 A1 | 3/2010 | Deyoung | |
| 2012/0014559 A1 | 1/2012 | Suehling | |
| 2014/0198234 A1* | 7/2014 | Kobayashi | H04N 1/32144 |
| | | | 348/231.99 |
| 2014/0328540 A1* | 11/2014 | Wang | G06K 9/00476 |
| | | | 382/173 |
| 2015/0067471 A1 | 3/2015 | Bhardwaj | |
| 2015/0089337 A1 | 3/2015 | Grady | |
| 2017/0098141 A1* | 4/2017 | Wang | G06N 3/0454 |
| 2017/0270123 A1* | 9/2017 | Jhamtani | G06F 16/24578 |
| 2018/0285321 A1* | 10/2018 | Antony | G06K 9/6892 |
| 2018/0285362 A1* | 10/2018 | McCoy | G06Q 10/10 |
| 2018/0330204 A1* | 11/2018 | Kim | G06F 16/284 |
| 2018/0359363 A1* | 12/2018 | Moran | G06K 9/00744 |
| 2019/0138805 A1 | 5/2019 | Saha | |

OTHER PUBLICATIONS

"Prototypes, Specifications, and Diagrams in One Tool", Axure Software, <https://www.axure.com/>, printed Jun. 28, 2017, 2 pages.

"Resources for Teachers: How to Detect Plagiarism", MIT Comparative Media Studies/Writing, <http://cmsw.mit.edu/writing-and-communication-center/resources/teachers/detect-plagiarism/>, printed Jun. 28, 2017, 3 pages.

Hoffman et al., "Towards the Integration of UML- and textual Use Case Modeling", Journal of Object Technology, Published by ETH Zurich, Chair of Software Engineering © JOT, 2009, vol. 8, No. 3, May-Jun. 2009, 16 pages.

Hsieh et al., "Search-Based Automatic Image Annotation Via Flickr Photos Using Tag Expansion", ICASSP, 2010978-1-4244-4296-6/10/$25.00 © 2010 IEEE, pp. 2398-2401.

IBM Appendix P, list of patents and patent applications to be treated as related, Filed Herewith, 2 pages.

* cited by examiner

EVALUATING IMAGE-TEXT CONSISTENCY WITHOUT REFERENCE

BACKGROUND OF THE INVENTION

The present invention relates generally to the field of imagery annotation, and more particularly to medical imagery annotation.

In various domains, there is need for an automated way of assessing and evaluating multi-modal content (text/image/video/audio) without having the true reference data (e.g., medical imagery and/or report consistency, student book publishing, instruction manual developers, construction planning architects, and error snapshot documenting for bug resolution). One key aspect in textual descriptions are images associated with the textual descriptions. Usually images associated with the textual descriptions are annotated with labels identifying the different segments of the image. There is no standardized way of labeling images in any of these domains and the labeling techniques can be completely open ended and subjective. Currently, in the art, there are no systems that understand annotated images and validate the free-form textual description (position, size, texture etc.) within the annotated image. Additionally, on an average 1 to 3 dollars is spent per page on basic proof-reading, wherein the general turnaround time is 3 days per chapter. Currently, there are a plethora of methods available for consistency/typo detection in natural language, however, there are no system for doing this between image and text.

SUMMARY

Embodiments of the present invention disclose a method, a computer program product, and a system for evaluating text and image consistency, the method includes: receiving, by one or more processors, one or more images; receiving, by the one or more processors, one or more text documents; identifying, by the one or more processors, relevant text in the one or more text documents; determining, by the one or more processors, the consistency between the one or more images and the one or more text documents; creating, by the one or more processors, one or more image and text consistency scores based on the determined consistency between the one or more images and the one or more text documents; outputting, by the one or more processors, the one or more image and text consistency scores for evaluating text and image consistency; and outputting, by the one or more processors, inconsistency in errors in resolution and content mismatch between the one or more images and the one or more text documents.

DETAILED DESCRIPTION

Embodiments of the present invention enables automated consistency between medical imagery and the medical reports describing them. This improves the art of medical imagery because currently physicians and technicians manually write reports describing the image; additionally, each field of practice and/or medical professional has a different arbitrary way of labeling the image. Additionally, because of the immense number of reports that are manually written these reports and image annotations are vulnerable to subjective interpretation. Often these reports can have inconsistencies with the image. For example, the size, shape, annotation, nomenclature, and/or location of the labeled objects. Embodiments of the present invention improve the art of text-to-image and/or image-to-text annotation by taking measures to ensure the reports and annotated images are consistent with one-another.

Figure 1:
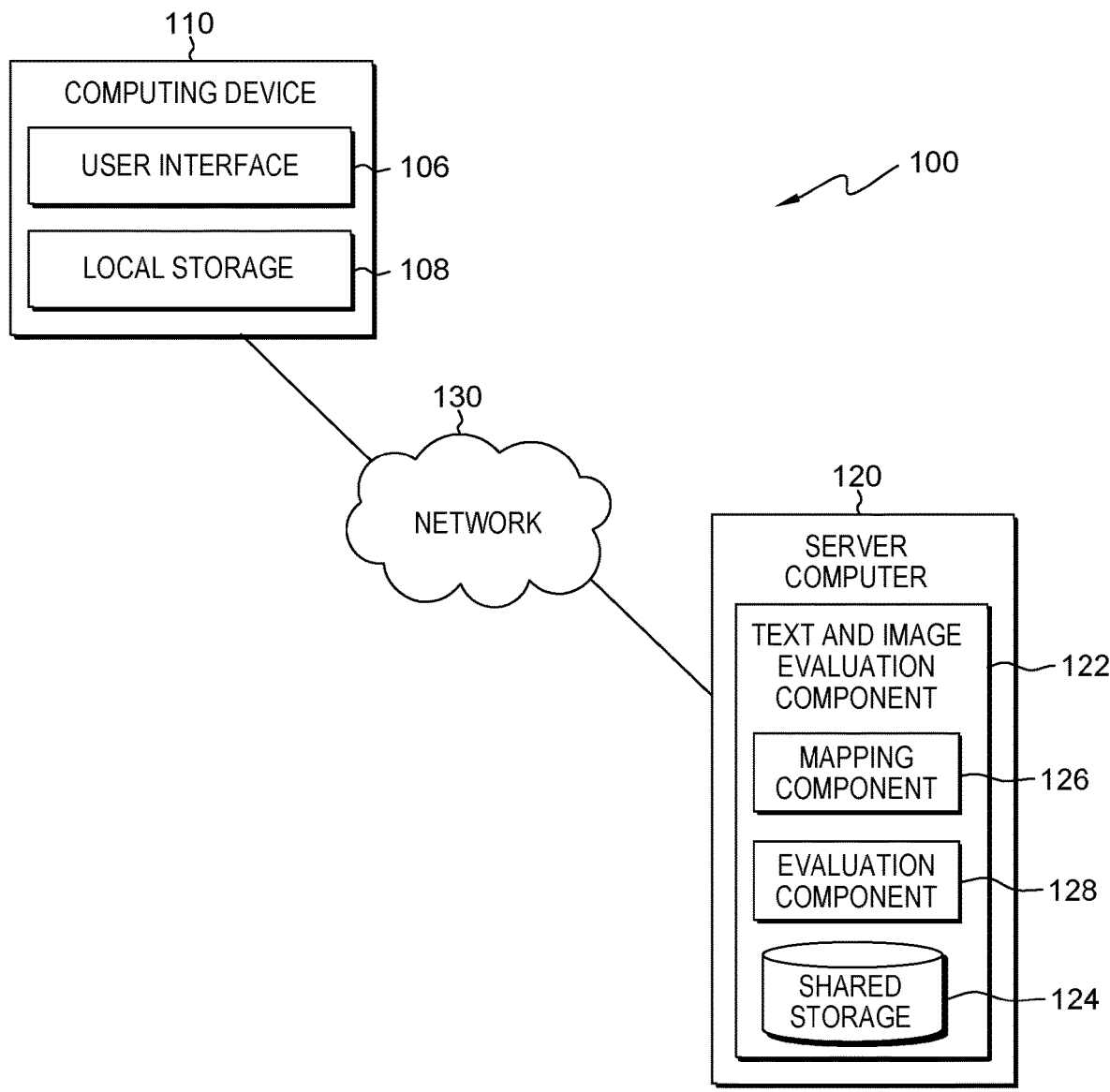
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, server computer 120, interconnected over network 130. Network 130 can be, for example, a telecommunications network, a local area network (LAN), a wide area network (WAN), such as the Internet, or a combination of the three, and can include wired, wireless, or fiber optic connections. Network 130 can include one or more wired and/or wireless networks that are capable of receiving and transmitting data, voice, and/or video signals, including multimedia signals that include voice, data, and video information. In general, network 130 can be any combination of connections and protocols that will support communications between computing device 110 and server computer 120, and other computing devices (not shown in FIG. 1) within distributed data processing environment 100.

In various embodiments, computing device 110 can be, but is not limited to, a standalone device, a server, a laptop computer, a tablet computer, a netbook computer, a personal computer (PC), a smart phone, a desktop computer, a smart television, a smart watch, any programmable electronic computing device capable of communicating with various components and devices within distributed data processing environment 100, via network 102 or any combination therein. In general, computing device 110 are representative of any programmable mobile device or a combination of programmable mobile devices capable of executing machine-readable program instructions and communicating with users of other mobile devices via network 130 and/or capable of executing machine-readable program instructions and communicating with server computer 120. In other embodiments, computing device 110 can represent any programmable electronic computing device or combination of programmable electronic computing devices capable of executing machine readable program instructions, manipulating executable machine readable instructions, and communicating with server computer 120 and other computing devices (not shown) within distributed data processing environment 100 via a network, such as network 130. Computing device 110 includes an instance of user interface 106. Computing device 110 and user interface 106 allow a user to interact with text and image evaluation component 122 in various ways, such as sending program instructions, receiving messages, sending data, inputting data, editing data, correcting data and/or receiving data.

User interface (UI) 106 provides an interface to text and image evaluation component 122 on server computer 120 for a user of computing device 110. In one embodiment, UI 106 can be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, UI 106 can also be mobile application software that provides an interface between a user of computing device 110 and server computer 120. Mobile application software, or an "app," is a computer program designed to run on smart phones, tablet computers and other mobile devices. In an embodiment, UI 106 enables the user of computing device 110 to send data, input data, edit data (annotations), correct data and/or receive data. In various embodiments, UI 106 can enable the user to upload/enter documents to text and image evaluation component 122.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any other programmable electronic device capable of communicating with computing device 110 and other computing devices (not shown) within distributed data processing environment 100 via network 130. In another embodiment, server computer 120 represents a computing system utilizing clustered computers and components (e.g., database server computers, application server computers, etc.) that act as a single pool of seamless resources when accessed within distributed data processing environment 100. Server computer 120 can include text and image evaluation component 122 and shared storage 124. Server computer 120 can include internal and external hardware components, as depicted, and described in further detail with respect to FIG. 4.

Shared storage 124 and local storage 108 can be a data repository and/or a database that can be written to and/or read by one or a combination of text and image evaluation component 122, server computer 120 and/or computing devices 110. In the depicted embodiment, shared storage 124 resides on server computer 120. In another embodiment, shared storage 124 can reside elsewhere within distributed data processing environment 100 provided coverage assessment program 110 has access to shared storage 124. A database is an organized collection of data. Shared storage 124 and/or local storage 108 can be implemented with any type of storage device capable of storing data and configuration files that can be accessed and utilized by server computer 120, such as a database server, a hard disk drive, or a flash memory. In other embodiments, shared storage 124 and/or local storage can be hard drives, memory cards, computer output to laser disc (cold storage), and/or any form of data storage known in the art. In various embodiments, text and image evaluation component 122 can store and/or retrieve data from shared storage 124 and local storage 108. For example, text and image evaluation component 122 will store image annotation information to shared storage 124 and access previously stored image annotation information to assist in future image annotation assignments. In various embodiments, text and image evaluation component 122 can have cognitive capabilities and learn from previous files and/or data text and image evaluation component 122 has interacted with and/or has stored to local storage 108 and/or shared storage 124. For example, retrieving and analyzing previously generated annotations and/or annotation scores, analyzed images, and/or identified image attributes and/or annotation styles.

In various embodiments, text and image evaluation component 122 is housed on server computer 120; however, in other embodiments, text and image evaluation component 122 can be housed on computing device 110, and/or a computing device and/or server computer not depicted in FIG. 1. In various embodiments, text and image evaluation component 122 can evaluate image and text consistency.

In various embodiments, mapping component (MC) 126 and evaluation component (EC) 128 are subcomponents of text and image evaluation component 122. In various embodiments, EC 128, MC 126, and/or text and image evaluation component 122 can work together (e.g., in sync) to output an image and text consistency score. For example, text and image evaluation component 122 receives a hand drawing of a brain comprising hand written annotations, and an essay describing the hand drawn brain. In this particular example, MC 126 takes the image and analyzes the image and annotations, while simultaneously analyzing the essay looking for relevant text pertaining to the image, and maps the relevant text to the annotation. Subsequently, in this particular example, EC 128 compares and/or analyzes the relevant text with the results of the brain labeling/annotations to see how well the relevant text and annotation match and then outputs the text and image consistency score based on the comparison and/or analysis of the relevant text and the annotations.

In various embodiments, MC 126 can map the relevant section of a text document to associated images, in which a user, via UI 106, a user can enter key words mentioned in the image and/or image caption to receive relevant portions from the text document. In other embodiments, MC 126 can automatically identify relevant and/or keywords in the image caption and retrieve relevant portions from the text document, in which text and image evaluation component can generate/create image annotations. Furthermore, in various embodiments, a user can give MC 126 a reference to the image in the one or more text documents while textually describing the image. In other embodiments, MC 126 can search and/or retrieve data and/or information (e.g., annotations, definitions, captions, etc.) regarding key words entered and/or identified in the text, image, captions, and/or annotations from shared storage 124, local storage 108, and/or the internet.

In various embodiments, EC 128 can evaluate image and text consistency for received text documents and/or images. For example, an essay written by a student on skeletal anatomy and a hand drawn image with annotations relating to the essay. In this particular example, MC 126 would map the relevant section of the essay to the associated images, and for each text section and image pair, EC 128 would evaluate the consistency between the one or more text and image pairs, and determine if the annotations accurately reflect the essay. In various embodiments, the mapping of one or more relevant sections of a text document to one or more associated images comprises spot tasking in information retrieval, in which a user, using UI 106, can use the keywords mentioned in the image caption to retrieve the relevant portions of the document. In other embodiments, a user can instruct text and image evaluation component 122 and/or MC 126 to locate the relevant portions in the document using keywords and text and image evaluation component 122 and/or MC 126 can automatically locate and/or retrieve the relevant portions of the text based on the entered keywords from local storage, 108, shared storage 124, the internet, and/or a received text document. In various embodiments, subsequent to analyzing the document and identifying the relevant text descriptions, text and image evaluation component 122 can label the image based of the identified text description by proving one or more labels to image based on the identified text description and/or retrieved data from local storage. In various embodiments, subsequent to labeling the image EC 128 can output an image to text consistency score.

In various embodiments, for each text section and image pair, EC 128 can evaluate the consistency between the one or more text sections and the one or more image pairs. For example, Given the following text "the human brain consists of three significant areas, midbrain, cerebrum, . . . the brain stem is in the upper portion of the brain above the medulla," and an image of a brain drawn by a user, EC 128 gives a consistency score between the essay and the drawing based on the understanding of the linguistic description of the following attributes of an image. In various embodiments, text and image evaluation component 122 and/or MC 126 can understand the different attributes of the image mentioned in the text. For example, relative positioning and relative sizes of segments, and/or image attributes (e.g., color/texture/shape/pattern/contour) of the different segments. Image attributes can be, but are not limited to, color, shape, texture, contour, depth, location, shading, tint, brightness, transparency, annotation location, annotation positions, sharpness, annotation style, labeling style, and/or any other image attributes known in the art.

In various embodiments, text and image evaluation component 122 and/or MC 126 can identify attributes in a text document (e.g., an essay) by using static lexicon, since the attributes are usually a closed set. For example, MC 126 can identify that the location of the brain stem is in the upper portion of the brain and associate the text related to the brain stem. Similarly, in various embodiments, text and image evaluation component 122 can use static lexicon on images to detect attributes from current and previous images. For example, the area labeled brain stem is in the upper portion of the area labeled brain, in which, text and image evaluation component 122 can reference other brain images and their annotations and determine if the appropriate portion of the brain is labeled. In various embodiments, text and image evaluation component 122 can references other images (e.g., image attributes), and/or their annotations to see if they are similar and/or identical.

In various embodiments, one or more identified attributes can receive an image to text consistency score based on the text description and the image based detection. Additionally, in various embodiments, EC 128 can give out an aggregate consistency score based on the weighted combination of the aforementioned consistency scores. In some embodiments, over time, text and image evaluation component 122 and/or EC 128 can "learn" the optimum weighing of different factors conditional to the subject pertaining to the essay. For example, over time, text and image evaluation component 122 will learn the proper location and textual description of the frontal cortex. In another example, "color" may be an important attribute for a biological essay but not for a topic on geography, whereas "position" is of high importance for both geographical and biological topics. In various embodiments, text and image evaluation component 122 can also be used for correctness evaluation between the textual description written by the student and a gold image in the training corpus (if corresponding gold text is not available) or vice-versa. In various embodiments, text and image evaluation component 122 can link relevant/mentioned attributes form one or more text documents to one or more labeled segment in one or more images and/or text documents. In various embodiments, text and image evaluation component 122 can work offline and/or without a database. In this particular example, text and image evaluation component 122 can receive, monitor, record, analyze, output and/or store a consistency score using learned data and behavior (e.g., data stored on local storage 108). In this particular example, text and image evaluation component 122 can check the consistency score and/or received data while offline and compare it to data/information on share storage 124.

In various embodiments, text and image evaluation component 122 can understand the type of attributes being labeled in the image. Additionally, in various embodiments, text and image evaluation component 122 and/or MC 126 can use an entity-specific segmentation algorithm for segmenting out all the attributes in the image. Furthermore, in various embodiments, text and image evaluation component 122 performs label understanding and/or label matching by using a segmentation algorithm (to match segments in the image with a text label). In various embodiments, text and image evaluation component 122 can perform standard label matching, and/or unknown labeling, which comprises, but is not limited to, naïve region growing based matching, label matching when the individual labels have been seen, saved, and/or learned from data previously used and/or save by text and image evaluation component 122. In various embodiments, text and image evaluation component 122 can label non-trivial free-form image labeling (e.g., label hand drawn images and/or annotations). In various embodiments, text and image evaluation component 122 can enable offline use (e.g., offline phase), wherein each domain can comprise a predefined list of attributes. For example, geography being the domain would comprise a predefined list containing rivers, lakes, oceans, streams, mountain ranges, cities, states, countries, continents, capitals of states and/or countries, parks, national parks and/or nature reserves. In various embodiments, text and image evaluation component 12 can enable online use (e.g., online phase), from the associated text, text and image evaluation component 12 understands the type of attributes labeled in the image. For example, retrieving data from an internet based data based and/or search engine to determine Brahmaputra is a river, and/or West Bengal, Arunachal Pradesh are states. In various embodiments, text and image evaluation component 122 can learn entity-specific segmentation. Furthermore, text and image evaluation component 12 can have a collection of images for each of the pre-defined entity types (e.g., image attributes and/or annotations). For example, in geography: segmentation of a "river" means a bounding box over a open/ended arbitrary line, segmentation of a "state/country/ lakes" means a bounding box over a closed region/area, and for "oceans", segmentation focuses on an open-ended region.

In various embodiments, text and image evaluation component 122 can be initially trained with a few styles of labeling. For example, text and image evaluation component 122 is trained to identify at least one of: different kinds of arrows (e.g., annotations) used for pointing and/or directing (e.g., directed/undirected, solid line/dotted/straight line/ curved or angled), brackets or boxes or call-outs used to point an area, and/or different indexing styles (e.g., index styles based on shading of areas/using placeholder names & defining the placeholders separately). In various embodiments, for a given test labeled image, for one or more labels text and image evaluation component 122 can match the labeling style with one of the known labeling styles. Annotation(s) can be, but are not limited to, arrows, colors, bold font, a text box, dotted lines, throbbing text, any shape known in the art, a thought cloud, a speech cloud, a footnote, a note, a reference number, captions, map legends, text descriptions and/or any annotation known in the art.

In various embodiments, text and image evaluation component 122 can understand the meaning of the labels with or without providing direct arrows pointing to the area labeled. In various embodiments, in the presence of explicit arrows, text and image evaluation component 122 can find the closest arrow leading to an area in the image, and text and image evaluation component 122 can then create a region based segmentation (e.g. region growing) with the arrow end-point as seed position and links the text to the segmented area, for one or more text documents. In various embodiments, in the absence of explicit arrows for one or more text documents, text and image evaluation component 122 can create a region based segmentation taking the text position as a starting seed point and growing the region to come up with segments, in which the one or more of the segments can be annotated with the text either from a database, the internet (e.g., online), and/or a text document.

In various embodiments, text and image evaluation component 122 can learn by understand/match labels to segments in an image to labels that text and image evaluation component 122 has been exposed to in the past. In various embodiments, text and image evaluation component 122 can generate labels for different segments of an image being described and/or analyzed. In various embodiments, text and image evaluation component 122 can generate labels using unsupervised attention on images to understand which segment of the image maps/is associated to which label. Furthermore, in various embodiments the images in the collection can be used to learn the mapping between image-segment and label. Additionally, in various embodiments, text and image evaluation component 122 can generate labels using supervised region based attention on images, in which text and image evaluation component 122 uses user supervision to map regions in an image to labels.

In various embodiments, text and image evaluation component 122 can receive user supervision and/or guidance via UI 106. Furthermore, text and image evaluation component 122 can use a fraction of the image collection for which the labeling style has already been identified (i.e. the image-segments have been mapped to corresponding labels). In various embodiments, text and image evaluation component 122 can used unsupervised and supervised attention together, separately, and/or simultaneously. Additionally, in various embodiments, if text and image evaluation component 122 can recognize at least one of the individual labels in an image from the past data it will use both unsupervised and supervised attention to annotate the corresponding segment of the image which has been recognized, based on the link between the segment of the image and the annotated label, wherein the link can be based on color, texture, shading, proximity, arbitrary arrows, lines, callout, etc.) text and image evaluation component 122 can learn the labeling style of the current image, assuming the user has used the same labeling style for all the labels in that image, text and image evaluation component 122 can use the new learnt labeling style and apply it for the remaining labels in the image.

Figure 2:
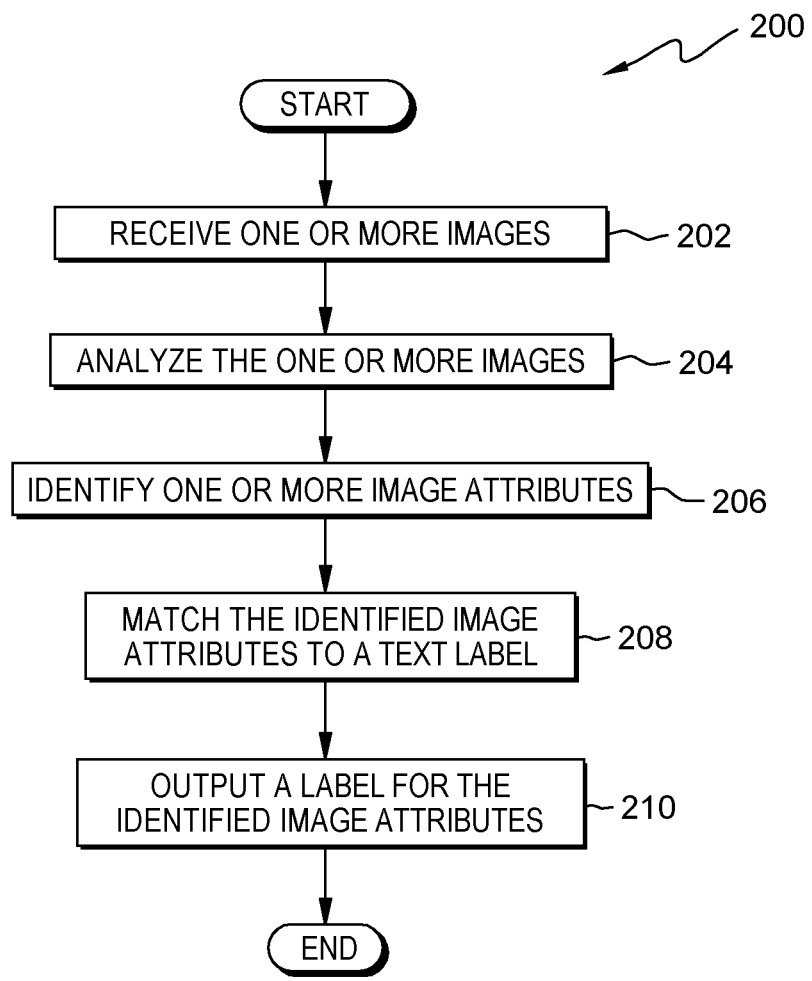
FIG. 2 is a flowchart depicting operational steps of a text and image evaluation component, on a server computer within the distributed data processing environment of FIG. 1, for identifying and labeling image attributes, in accordance with an embodiment of the present invention.

FIG. 2 is a flowchart depicting operational steps of text and image evaluation component 122, on server computer 120 within distributed data processing environment 100 of FIG. 1, in accordance with an embodiment of the present invention. It should be appreciated that FIG. 2 provides only an illustration of one implementation and does not imply any limitations with regard to the environments in which different embodiments can be implemented. Many modifications to the depicted environment can be made.

In step 202, text and image evaluation component 122 can receive one or more images. In various embodiments, text and image evaluation component 122 can receive a hand drawn image, a digital drawing, a print out of a digital illustration, a photo copy of a hand drawn image, and/or any other form of drawing and/or illustration known in the art. In various embodiments, the received image can comprise annotations.

In step 204, text and image evaluation component 122 analyzes the one or more images. In various embodiments, text and image evaluation component 122 can analyze the one more images by referencing previously analyzed images, annotations, and/or text documents stored on local storage 108 and/or shared storage 124.

In step 206, MC 126 identifies one or more image attributes. In various embodiments, text and image evaluation component 122 can identify one or more image attributes in the one or more received images by referencing previously analyzed images, annotations, and/or text documents stored on local storage 108, shared storage 124, and/or searching the internet.

In step 208, MC 126 matches the identified image attributes to a text label. In various embodiments, the text label can be retrieved from a current or past text document, and/or a database. In other embodiments, MC 126 can generate/ create a text label based on the identified image attributes. In step 210, MC 126 outputs a label for the identified image attributes.

Figure 3:
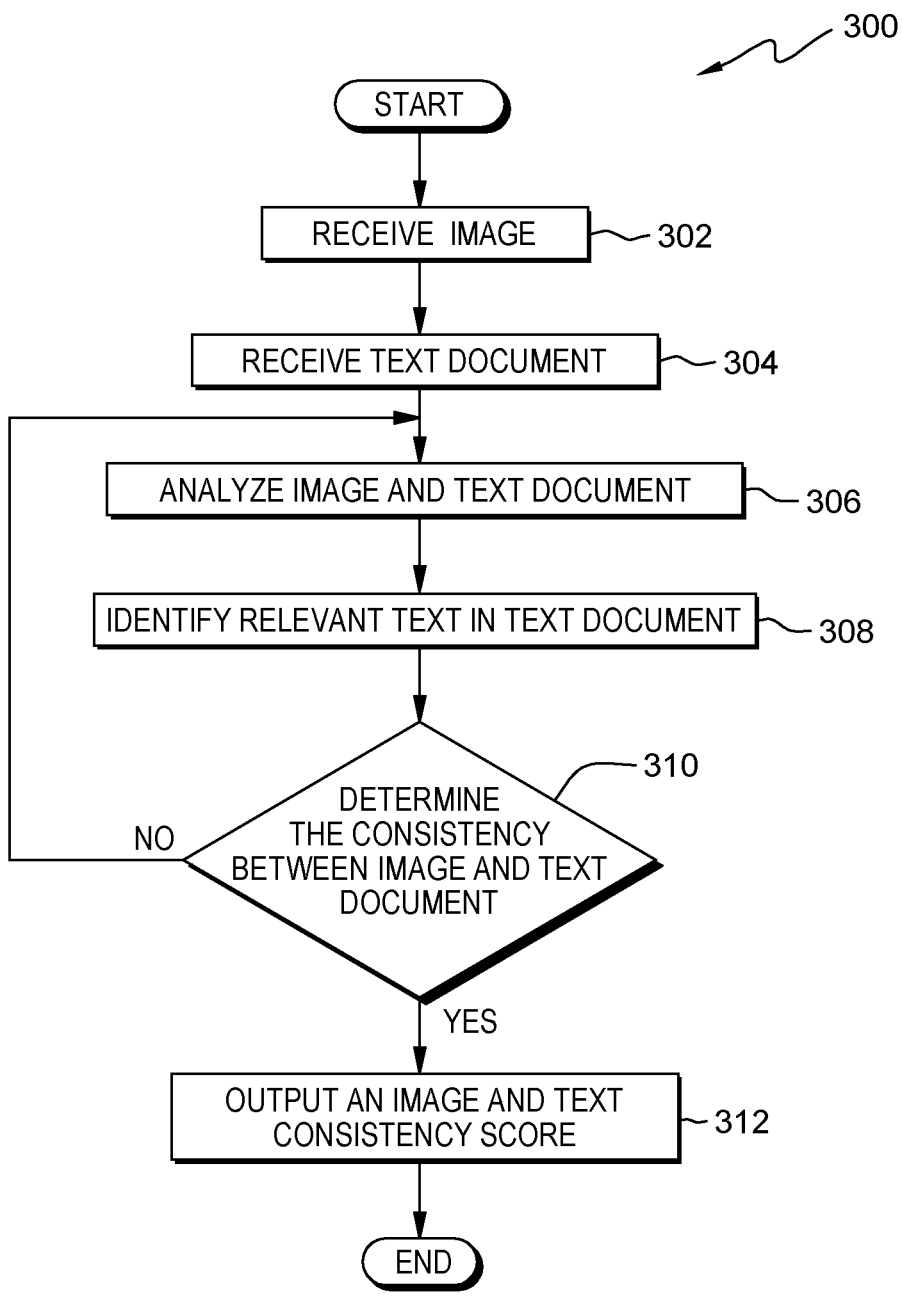
FIG. 3 is a flowchart depicting operational steps of the text and image evaluation component, on a server computer within the distributed data processing environment of FIG. 1, for determining a consistency score between the text and image, in accordance with an embodiment of the present invention.

FIG. 3 is a flowchart depicting operational steps of text and image evaluation component 122, on server computer 120 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

In step 302, text and image evaluation component 122 receives an image. In various embodiments, text and image evaluation component 122 can receive one or more images. The received drawings can be hand drawn images, digital drawings, print out of digital illustrations, photo copies of the hand drawn image, and/or any other form of drawing and/or illustration known in the art. In various embodiments, the received image can comprise annotations. In step 304, text and image evaluation component 122 receive a text document. In various embodiments, text and image evaluation component 122 can receive one or more text documents.

In step 306, text and image evaluation component 122 analyzes the image and the text document. In various embodiments, text and image evaluation component 122 can analyze the received one or more images, and the received one or more text documents. In various embodiments, text and image evaluation component 122 can analyze and/or review an image, an images annotations, a text document, and/or key words in the text document. In step 308, MC 126 identifies relevant text in the text document. In various embodiments, MC 126 can identify one or more relevant texts (e.g., keyword) from one or more text documents. In various embodiments, the relevant text describes and/or relates to the segments of an image. For example, if the image is a brain scan MC 126 will identify keywords pertaining to the brain scan (e.g., frontal cortex, cerebellum, occipital lope, medulla oblongata, etc.).

In step 310, EC 128 determines the consistency between the image and the text document. In various embodiments, EC 128 can determine the consistency between one or more images and one or more text documents. In various embodiments, EC 128 can determine how well a text document relates/describes an image and/or the images annotations by reviewing the analysis of the text document and the image. For example, determining if the user's description of an x-ray is consistent with the image attributes and/or annotations of the x-ray (e.g., medial femur fracture).

In step 312, EC 128 outputs an image and text consistency score. In various embodiments, EC 128 can output one or more image and text consistency scores for one or more images and one or more text documents based on the determined consistency between the one or more images and the one or more text documents. For example, if a medical report is describing the diagnosis and details of a CAT scan but the annotations of the CAT scan only disclose half of the material in the medical report EC 128 would output a 50% consistency score. It should be noted that the representation of the consistency score can be displays/reported in any mathematical, alphabetical, and/or alphanumeric way known in the art. In other embodiments, EC 128 can identify and/or output inconsistency in errors in resolution and/or content (e.g., education) mismatch between text and image annotation. For example, checking a student's answer consistency on brain description, wherein the brain stem is in the upper portion of the brain above the medulla EC 128 will output a score of zero percent and/or output an error annotation. In various embodiments, EC 128 can output and/or alert other authorized medical professionals and/or Educators of a consistency score. For example, sending the outputted consistency score of students examines to course Professor. In another example, sending the outputted consistency score of resident and/or medical interns to Superior medical professionals. In another example, EC 128 will send the consistency score of the engineering and architecture designs to the lead architect and/or site manager.

Figure 4:
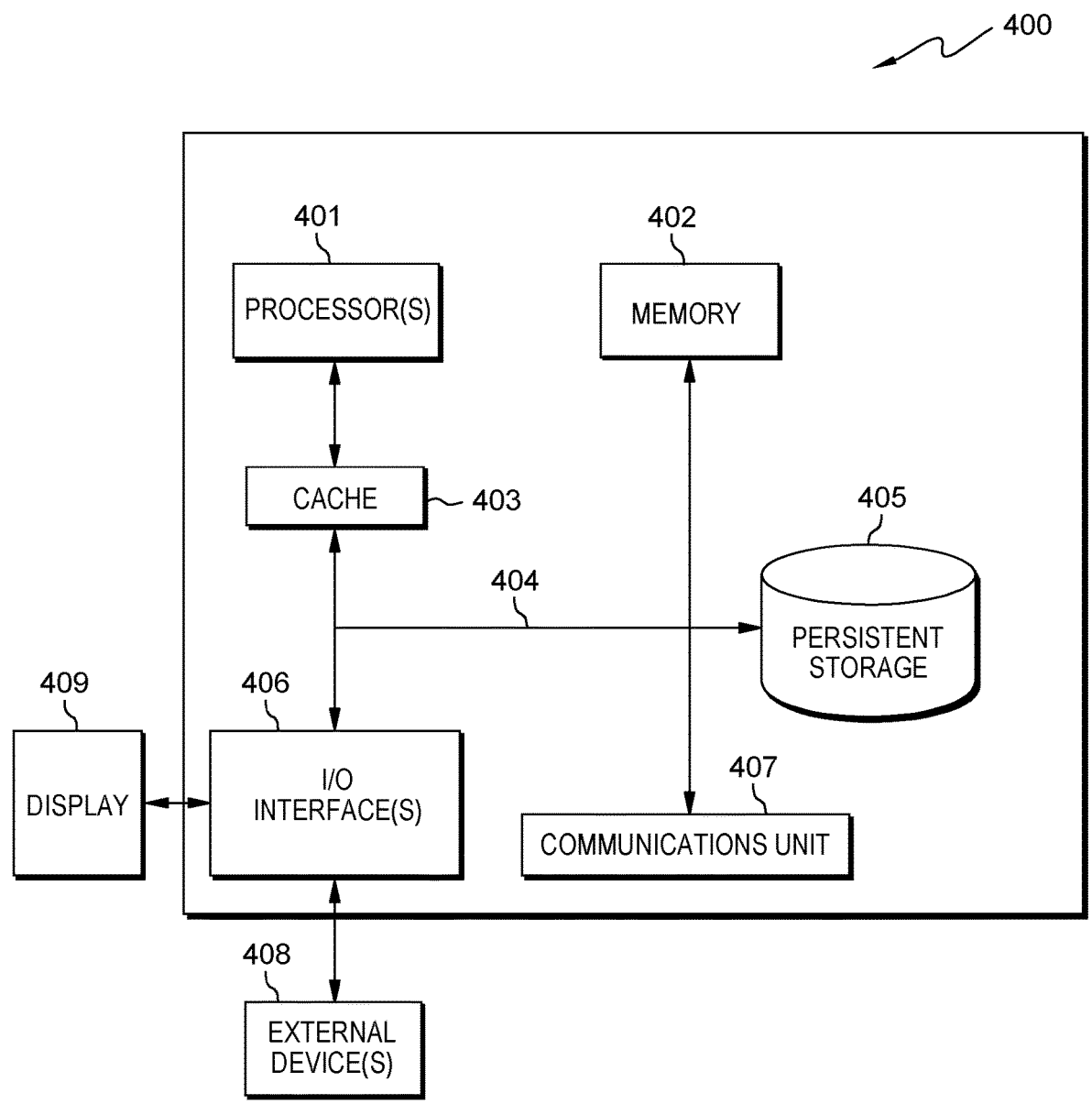
FIG. 4 depicts a block diagram of components of the server computer executing the intelligent mapping program within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

FIG. 4 depicts computer system 400, where server computer 120 represents an example of computer system 400 that includes text and image evaluation component 122. The computer system includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 enables for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for evaluating text and image consistency, the method comprising: identifying, by the one or more processors, text in one or more text documents; determining, by the one or more processors, consistency between the one or more images and the one or more text documents; creating, by the one or more processors, one or more image and text consistency scores based on the determined consistency between the one or more images and the one or more text documents; outputting, by the one or more processors, the one or more image and text consistency scores for evaluating text and image consistency; and outputting, by the one or more processors, inconsistency in errors in resolution and content mismatch between the one or more images and the one or more text documents.

2. The method of claim 1 further comprising: receiving, by one or more processors, one or more images; receiving, by the one or more processors, one or more text documents.

3. The method of claim 1, wherein the one or more image and text consistency scores are displayed in a mathematical, alphabetical, or alphanumeric manner.

4. The method of claim 1 further comprising: identifying, by the one or more processors, one or more image attributes; matching, by the one or more processors, the identified image attributes to a text label; and outputting, by the one or more processors, one or more labels for the identified image attributes.

5. The method of claim 1 further comprising: analyzing, by the one or more processors, the one or more images and the one or more text documents, wherein the analysis comprises analyzing keywords in the text document and annotations on the one or more images.

6. The method of claim 5, wherein the annotations comprise at least one of: arrows, colors, bold font, a text box, dotted lines, throbbing text, any shape known in the art, a thought cloud, a speech cloud, a footnote, a note, a reference number, captions, map legends, or text descriptions.

7. The method of claim 1, wherein the image attributes comprise at least one of: color, shape, texture, contour, depth, location, shading, tint, brightness, transparency, annotation location, annotation positions, sharpness, or annotation style.

8. A non-transitory computer program product for evaluating text and image consistency, the computer program product comprising: one or more computer readable storage devices and program instructions stored on the one or more computer readable storage devices, the stored program instructions comprising: program instructions to identify text in one or more text documents; program instructions to determine consistency between the one or more images and the one or more text documents; program instructions to create one or more image and text consistency scores based on the determined consistency between the one or more images and the one or more text documents; program instructions to output the one or more image and text consistency scores for evaluating text and image consistency; and program instruction to output inconsistency in errors in resolution and content mismatch between the one or more images and the one or more text documents.

9. The non-transitory computer program product of claim 8 further comprising: program instructions to receive one or more images; and program instructions to receive one or more text documents.

10. The non-transitory computer program product of claim 8, wherein the one or more image and text consistency scores are displayed in a mathematical, alphabetical, or alphanumeric manner.

11. The non-transitory computer program product of claim 8 further comprising: program instructions to identify one or more image attributes; program instructions to match the identified image attributes to a text label; and program instructions to output one or more labels for the identified image attributes.

12. The non-transitory computer program product of claim 8 further comprising: program instructions to analyze the one or more images and the one or more text documents, wherein the analysis comprises analyzing keywords in the text document and annotations on the one or more images.

13. The non-transitory computer program product of claim 12, wherein the annotations comprise at least one of: arrows, colors, bold font, a text box, dotted lines, throbbing text, any shape known in the art, a thought cloud, a speech cloud, a footnote, a note, a reference number, captions, map legends, or text descriptions.

14. The non-transitory computer program product of claim 8, wherein the image attributes comprise at least one of: color, shape, texture, contour, depth, location, shading, tint, brightness, transparency, annotation location, annotation positions, sharpness, or annotation style.

15. A computer system for evaluating text and image consistency, the computer system comprising: one or more computer processors; one or more computer readable storage devices; program instructions stored on the one or more computer readable storage devices for execution by at least one of the one or more computer processors, the stored program instructions comprising: program instructions to identify text in one or more text documents; program instructions to determine consistency between the one or more images and the one or more text documents; program instructions to create one or more image and text consistency scores based on the determined consistency between the one or more images and the one or more text documents; program instructions to output the one or more image and text consistency scores for evaluating text and image consistency; and program instruction to output inconsistency in errors in resolution and content mismatch between the one or more images and the one or more text documents.

16. The computer system of claim 15 further comprising: program instructions to receive one or more images; and program instructions to receive one or more text documents.

17. The computer system of claim 15, wherein the one or more image and text consistency scores are displayed in a mathematical, alphabetical, or alphanumeric manner.

18. The computer system of claim 15 further comprising: program instructions to identify one or more image attributes; program instructions to match the identified image attributes to a text label; and program instructions to output one or more labels for the identified image attributes.

19. The computer system of claim 15 further comprising: program instructions to analyze the one or more images and the one or more text documents, wherein the analysis comprises analyzing keywords in the text document and annotations on the one or more images.

20. The computer system of claim 15, wherein the image attributes comprise at least one of: color, shape, texture, contour, depth, location, shading, tint, brightness, transparency, annotation location, annotation positions, sharpness, or annotation style.

* * * * *